United States Patent

[11] 3,634,177

[72] Inventor John H. Glaser
         Abington, Pa.
[21] Appl. No. 591,308
[22] Filed Nov. 1, 1966
[45] Patented Jan. 11, 1972
[73] Assignee General Electric Company

[54] LIGHTWEIGHT TRANSPARENT PENETRATION-RESISTANT STRUCTURE
6 Claims, 1 Drawing Fig.

[52] U.S. Cl............................................. 161/2,
         89/36, 161/166, 161/183, 161/252, 161/404
[51] Int. Cl........................................... B44f 1/00
[50] Field of Search............................ 161/183,
         404, 408, 166, 2, 252; 89/36

[56] References Cited
UNITED STATES PATENTS
2,733,177  1/1956  Meyer........................ 161/404

| 2,861,021 | 11/1958 | Dietz et al...................... | 161/404 |
| 2,991,209 | 7/1961 | Worrall.......................... | 161/404 |
| 3,135,645 | 6/1964 | Burkley et al.................. | 161/404 |
| 3,179,553 | 4/1965 | Franklin........................ | 161/404 |

Primary Examiner—Carl D. Quarforth
Assistant Examiner—Stephen J. Lechert, Jr.
Attorneys—Paul F. Prestia, Allen E. Amgott, Henry W. Kaufmann, Melvin M. Goldenberg, Frank L. Neuhauser and Oscar B. Waddell

ABSTRACT: The following has been found to be an effective, bulletproof transparent armor:

A laminated structure comprising a front plate of a very hard material such as sapphire, a relatively thin second lamina comprised of an adhesive resin such as polyvinylbutyl alcohol or its derivatives, a third lamina or shock plate comprised of a relatively thick layer of impact resistant material such as polymethyl methacrylate or polycarbonate and a fourth lamina or tension plate comprised of a thin layer of material similar to that used in the third lamina.

PATENTED JAN 11 1972
3,634,177
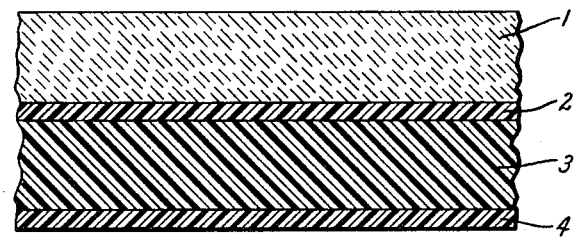
INVENTOR:
JOHN H. GLASER,
BY
AGENT

LIGHTWEIGHT TRANSPARENT PENETRATION-RESISTANT STRUCTURE

This invention relates to a more effective transparent armor material and, in particular, to a penetration-resistant structure which is lighter than those previously available.

Transparent, penetration-resistant material has many potential uses. In particular, this type of material, referred to generally herein as transparent armor, is used for observation ports and radiation windows in military equipment, including, for example, aircraft, small ships, and amphibious vehicles, such as amphibious tanks and gun carriers. In these and other similar applications, excessive weight is a severe handicap. The presently available transparent armor materials are effective only in great thicknesses. Substantial weight is therefore added to the equipment by the transparent armor materials. To avoid this weight handicap, transparent armor lighter than those presently available, is needed.

The object of the present invention is to provide lightweight transparent armor.

It is a further object of this invention to provide a bulletproof structure which is lighter in weight than any presently available.

Still another object of this invention is to provide an effective and lightweight transparent armor.

These and other objects are attained in accordance with this invention, by the provision of a laminated structure comprising at least four lamina in which the respective lamina have the following characteristics: the first or outer lamina, called the front plate, is extremely hard; generally it has a Rockwell hardness over 100, a rupture strength of over 100,000 pounds per square inch and a Young's modulus of over 60 million pounds per square inch; the second lamina, called the bond-film or interlayer, is a relatively soft, adhesive material; the third lamina, or shock plate, is a material having good impact resistance and a slow crack propagation rate relative to shock velocity in the material; and the fourth lamina or tension plate is a thin impact-resistant sheet which will be deformed, without breaking or cracking, under the influence of the tension pulses transmitted through the first three plates. Obviously, for good temperature stability, the various lamina should retain the properties described throughout the temperature range from −60° to 150° F. An important feature of this invention is that there exists good shock reflection within the front plate due to the impedance or shock velocity mismatch between the front plate and bond film.

In the preferred embodiment, the present invention comprises a layer of sapphire, i.e., α-alumina, as the front plate, polyvinylbutyl alcohol as the bond-film, a polyacrylate or polycarbonate as the shock plate and a thin sheet of polyacrylate or polycarbonate as the tension plate. Each of these materials must of course be transparent to light or radiant energy in accordance with the requirements of the finished article.

While the specification concludes with claims particularly pointing out and distinctly claiming the subject matter of the present invention, it is believed that the invention will be better understood from the following description taken in conjunction with the accompanying drawing in which:

The FIGURE is an expanded cross-sectional view of the preferred embodiment of the present invention.

More specifically, in the FIGURE there is shown a four component laminated structure comprising a front plate 1 of sapphire, a bond-film 2 of adhesive material, such as polyvinylbutyl alcohol or its derivatives, a shock plate 3 of polymethylmethacrylate or polycarbonate and a tension plate 4 of polymethylmethacrylate or polycarbonate.

The shock plate 3 and tension plate 4 may also be bonded together with an adhesive material, such as polyvinylbutyl alcohol. In addition, any of the four component lamina may comprise a plurality of thin layers bonded together with an adhesive material, such as polyvinyl butyl alcohol. Further, additional layers may be added to the above structure. These additional layers may comprise foreign materials, e.g., plate glass, or additional shock plates and tension plates.

Typically, all of the materials used are transparent but the transparency may be to light only or to some other form of radiant energy for which an armor window is required. For example, polycrystalline alumina may be used as the front plate for an infrared window in a sighting device. One such polycrystalline alumina material is Lucalox polycrystalline alumina, which is sold by the General Electric Company. Other suitable front plate materials include other ceramics, such as spinel, titania, silicon carbide, borides, etc. having the desired characteristics.

The effectiveness of the armor produced in accordance with the present invention depends on the interrelationship of the properties in the respective layers of the armor. The front plate, due to the properties enumerated above, tends to reflect the energy of the projectile back into the projectile and to cause fragmentation of the projectile. The high acoustical velocity in the extremely hard front plate contrasts with the very low acoustical velocity in the bond-film of the armor. This contrast, referred to herein as an impedance mismatch contributes to the energy reflection and absorption in the armor and this impedance mismatch is an important characteristic of the armor of the present invention.

A substantial portion of the energy absorbed by the armor is dissipated in the shock plate. Therefore a material having high impact resistance is required for the shock plate. Finally, the tension plate deforms slightly under the influence of the impulse transmitted through the shock plate and reflects the pulse into the shock plate thereby contributing to the overall energy absorption of the armor and inhibiting crack propagation in both the shock plate and the tension plate.

The effectiveness of armor produced in accordance with the present invention has been amply demonstrated. For example, the following structure was assembled and tested. A front plate comprising a layer of ¼-inch sapphire was bonded with a 50 mil interlayer of polyvinyl butyl alcohol to a composite shock-resistant layer comprising three ¼ inch sheets of polymethylmethacrylate bonded together with 50 mil interlayers of polyvinylbutyl alcohol. Two 25 mil sheets of Lexan polycarbonate (which is sold by the General Electric Company) bonded together and bonded to the shock-resistant composite with 50 mil interlayers of polyvinylbutyl alcohol comprise the fourth layer or tension plate. This laminated armor structure was tested for penetration-resistance against a 163 grain caliber .30 bullet fired from 6 feet at a velocity of 2,300 feet per second. Upon impact, the bullet was broken into fragments and the front plate of the armor was shattered. The laminate retained its structural integrity, however, and was not penetrated.

As an example of the method of making the laminated armor of the present invention, a structure was produced having 1. a layer of ⅜-inch transparent α-alumina as the front plate,
2. a bond-film comprising 0.050 inches of polyvinyl butyl alcohol,
3. a shock-resistant layer comprised of a sheet of 0.375 inch polymethylmethacrylate, and
4. a composite plate comprising two sheets of 0.0032 inches of polycarbonate bonded together and to the shock plate with polyvinylbutyl alcohol adhesive.

In making this structure, each layer was thoroughly cleaned, rinsed in deionized water, dried, and assembled in a suitable fixture to position the respective layers. These layers were assembled in a dust-free and moisture-free atmosphere and the personnel present were clothed in lint-free overalls and protective gloves. The assembly table was bottom lighted so that any foreign inclusion could readily be seen and eliminated prior to final assembly. Finally, the assembly was pressurized to 300 pounds per square inch and heated to 240° F. After heating and pressurizing, the assembly was slowly cooled to room temperature and depressurized. The panel was then inspected for flaws, leaks, discolorations, etc., and checked for dimensional correctness. The result was a lightweight and perfectly transparent penetration-resistant laminate.

Another example, illustrating the use of other materials, is a structure comprising ¼-inch Lucalox polycrystalline alumina, as the front plate, bonded with 0.050 inches of polyvinyl butyl alcohol to a ¼-inch plate glass layer. A layer of 0.075 inches of polyvinylbutyl alcohol bonds the plate glass to a 1-inch shock resistant layer comprising polymethyl methacrylate. These components are in turn bonded to a tension plate of 0.060 inches of Lexan polycarbonate with a layer of 0.025 inches of polyvinyl butyl alcohol. The total thickness of the structure is 1.710 inches and the structure weighs 15.92 pounds per square foot of frontal area. It should be noted that this is a translucent embodiment of the present invention. It is also transparent to radiant energy of certain wavelengths. In a test of this embodiment, a 163 grain caliber .30 armor piercing bullet was fired into the armor at a velocity of 2,350 feet per second and a range of 6 feet. The hardened steel projectile core was recovered uprange of the impact point and the armor was not perforated or penetrated. The front plate was fractured but was not completely removed, even at the impact point. The plate glass layer was partially pulverized over most of its volume but no penetration of the first polyvinyl butyl alcohol interlayer was noted. Some cracks extending radially from the impact centerline occurred in the polymethylmethacrylate shock resistant layer. The Lexan polycarbonate tension plate cracked but did not spall.

The samples and tests described above, are typical of many others which have been made in developing and demonstrating the present invention. The penetration-resistance of the structures described herein renders it possible to use substantially smaller quantities of armor material than those previously used to obtain the same degree of protection and thus substantial weight saving in transparent armor systems can be realized by the utilization of the present invention.

Although the present invention has been described with reference to preferred embodiments thereof, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by letters patent of the United States is:

1. A laminated, penetration-resistant structure including the following components:
   a. a first lamina comprising material having a Rockwell hardness over 100, a rupture strength of 10,000 pounds per square inch and a Young's modulus over 60 million pounds per square inch;
   b. a second lamina, adjacent said first lamina, comprising a soft resinous adhesive selected from the group consisting of polyvinylbutyl alcohol and derivatives of polyvinylbutyl alcohol;
   c. a third lamina, adjacent said second lamina, comprising an impact-resistant material having a low crack propagation rate relative to its shock velocity selected from a group consisting of polyacrylates and polycarbonates; and
   d. a fourth lamina, adjacent said third lamina, comprising a thin layer of impact resistant material selected from the group consisting of polyacrylates and polycarbonates.

2. A laminated, penetration-resistant structure, as recited in claim 1, wherein said first lamina comprises a ceramic material selected from the group consisting of sapphire, polycrystalline alumina, spinel, and titania.

3. A laminated, penetration-resistant structure, as recited in claim 1, wherein said first lamina is sapphire.

4. A laminated, penetration-resistant structure, as recited in claim 1, wherein said first lamina is comprised of a layer of sapphire, said second lamina is comprised of polyvinylbutyl alcohol, and said third lamina and said fourth lamina each comprise an impact-resistant resinous material selected from the group consisting of polyacrylates and polycarbonates.

5. A laminated, penetration-resistant structure, as recited in claim 1, wherein said first lamina is comprised of a layer of transparent sapphire, said second lamina is comprised of transparent polyvinylbutyl alcohol, and said third lamina and said fourth lamina each comprise an impact-resistant resinous transparent material from the group consisting of polyacrylates and polycarbonates.

6. A laminated penetration-resistant structure, as recited in claim 1, wherein said first lamina is comprised of a layer of transparent polycrystalline alumina, said second lamina is comprised of transparent polyvinylbutyl alcohol, and said third and fourth lamina each comprise an impact-resistant resinous transparent material from the group consisting of polyacrylates and polycarbonates.

* * * * *